US012617994B2

(12) United States Patent
Lee

(10) Patent No.: US 12,617,994 B2
(45) Date of Patent: May 5, 2026

(54) HEAT-DISSIPATING PLASTIC

(71) Applicant: AMOGREENTECH CO., LTD., Gimpo-si (KR)

(72) Inventor: Jin Hyoung Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 820 days.

(21) Appl. No.: 17/636,864

(22) PCT Filed: Aug. 21, 2020

(86) PCT No.: PCT/KR2020/011172
§ 371 (c)(1),
(2) Date: Feb. 19, 2022

(87) PCT Pub. No.: WO2021/034144
PCT Pub. Date: Feb. 25, 2021

(65) Prior Publication Data

US 2022/0267659 A1 Aug. 25, 2022

(30) Foreign Application Priority Data

Aug. 21, 2019 (KR) ........................ 10-2019-0102091

(51) Int. Cl.

| | |
|---|---|
| ***C09K 5/14*** | (2006.01) |
| ***C08K 3/04*** | (2006.01) |
| ***C08K 7/06*** | (2006.01) |

(52) U.S. Cl.
CPC ................ *C09K 5/14* (2013.01); *C08K 3/042* (2017.05); *C08K 3/045* (2017.05); *C08K 7/06* (2013.01); *C08K 2201/001* (2013.01); *C08K 2201/003* (2013.01); *C08K 2201/004* (2013.01); *C08K 2201/005* (2013.01)

(58) Field of Classification Search
CPC ................ C09K 5/14; C08K 2201/001; C08K 2201/003; C08K 2201/004; C08K 2201/005
See application file for complete search history.

(56) References Cited

U.S. PATENT DOCUMENTS

| | | | | |
|---|---|---|---|---|
| 2012/0175548 A1 | 7/2012 | Shin et al. | | |
| 2012/0322935 A1* | 12/2012 | Atarashi | .................. | C08K 3/04 524/496 |
| 2016/0091265 A1* | 3/2016 | Aramaki | ................ | C08K 3/105 165/185 |

FOREIGN PATENT DOCUMENTS

| | | |
|---|---|---|
| CN | 105308740 A | 2/2016 |
| CN | 105924952 A | 9/2016 |
| DE | 102017216290 A1 | 3/2019 |
| JP | 2015-000937 A | 1/2015 |
| KR | 2015-0069884 A | 6/2015 |
| KR | 10-2016-0031103 A | 3/2016 |
| KR | 10-2018-0099946 A | 9/2018 |
| WO | 2016-060511 A2 | 4/2016 |
| WO | 2017-061307 A1 | 4/2017 |

OTHER PUBLICATIONS

Office Action for CN 202080059048.3 by China National Intellectual Property Administration dated Sep. 27, 2024.
International Search Report dated on Dec. 4, 2020.
Office Action for CN 202080059048.3 by China National Intellectual Property Administration dated Apr. 8, 2025.

* cited by examiner

*Primary Examiner* — Jane L Stanley
(74) *Attorney, Agent, or Firm* — BROADVIEW IP LAW, PC

(57) ABSTRACT

A heat-dissipating plastic is provided. The heat-dissipating plastic according to an exemplary embodiment of the present invention is implemented by including a polymer matrix formed by including a main resin; and a carbon-based filler which is provided by being dispersed in the polymer matrix, and includes a fibrous carbon-based filler and a granular carbon-based filler. According to the above, the heat-dissipating plastic has remarkably excellent heat dissipation characteristics due to the remarkably excellent thermal conductivity, and it has an effect that the mechanical strength is remarkably excellent even though it is designed to have remarkably excellent heat dissipation characteristics. Accordingly, the implemented heat-dissipating plastic can be widely applied in various technical fields where excellent heat-dissipating performance and mechanical strength are required at the same time.

2 Claims, 1 Drawing Sheet

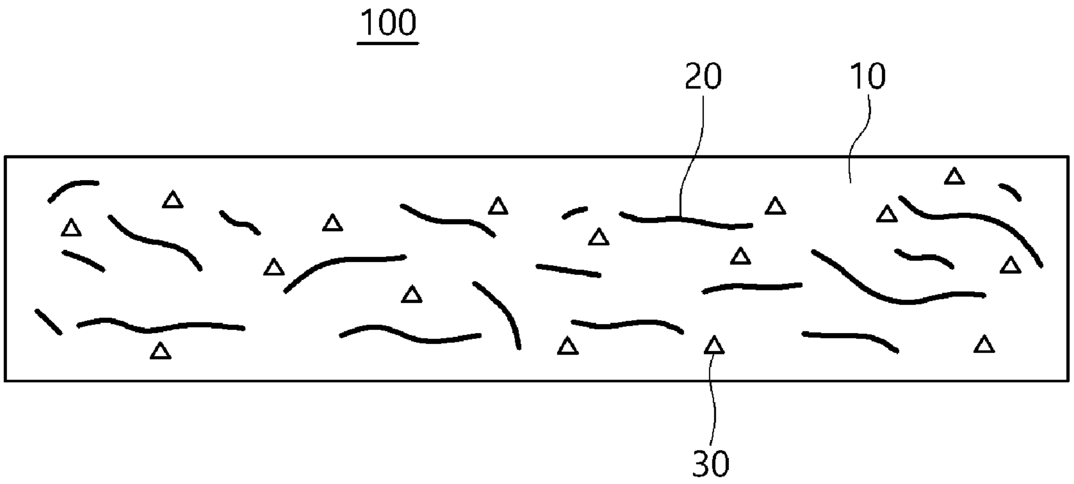
100
20
10
30

HEAT-DISSIPATING PLASTIC

CROSS-REFERENCE TO RELATED APPLICATION(S)

This application is a National Phase Entry Application of PCT Application No. PCT/KR2020/011172 filed on Aug. 21, 2020, which claims priority to Korean Patent Application No. 10-2019-0102091 filed on Aug. 21, 2019 in Korean Intellectual Property Office, the entire contents of which is hereby incorporated by reference in its entirety.

TECHNICAL FIELD

The present invention relates to a heat-dissipating plastic.

BACKGROUND ART

Heat build-up in electronic components, lights, converter housings and other devices that generate unwanted heat can significantly limit the product lifespan and reduce the operational efficiency.

In particular, as electronic devices become highly integrated as they become light, thin, compact and multifunctional, heat generation increases, and countermeasures therefore required. Dissipating heat is generated in electronic devices is very important because it is closely associated with the reliability and lifespan of devices. Conventionally, various heat dissipation devices such as heat dissipation fans, heat dissipation fins, heat pipes and the like have been developed, and recently, various heat-dissipating materials such as heat-dissipating pads, heat-dissipating sheets, heat-dissipating paints and the like have been developed to assist or replace heat-dissipating devices.

Metal, which is an excellent heat conductor, has been commonly used for heat management devices such as heat sinks and heat exchangers, but the metal part has problems in that the weight is heavy and the production cost is high. In addition, in the case of a conventional heat dissipation mechanism, excellent heat dissipation characteristics could not be expressed due to poor thermal conductivity, and in order to improve the thermal conductivity, there is an inevitable problem such as a decrease in mechanical strength, cracking and the like.

Accordingly, the situation is that there is an urgent need to develop a heat-dissipating material which is capable of expressing excellent heat dissipation characteristics as it has excellent mechanical strength, minimizes cracking and has remarkably excellent thermal conductivity.

DISCLOSURE

Technical Problem

The present invention has been devised in view of the above points, and it is an object of the present invention to provide a heat-dissipating plastic having remarkably excellent heat dissipation characteristics according to remarkably excellent thermal conductivity.

In addition, it is an object of the present invention to provide a heat-dissipating plastic having remarkably excellent mechanical strength even though it is designed to have remarkably excellent heat dissipation characteristics.

Technical Solution

In order to solve the above problems, the present invention provides a heat-dissipating plastic, including a polymer matrix formed by including a main resin; and a carbon-based filler which is provided by being dispersed in the polymer matrix, and includes a fibrous carbon-based filler and a granular carbon-based filler.

According to an exemplary embodiment of the present invention, the fibrous carbon-based filler may include a pitch-based carbon fiber including at least one selected from the group consisting of an isotropic pitch-based carbon fiber and an anisotropic pitch-based carbon fiber.

In addition, the fibrous carbon-based filler may be an anisotropic pitch-based carbon fiber.

In addition, the fibrous carbon-based filler may have an average fiber diameter of 5 to 20 μm.

In addition, the fibrous carbon-based filler may have an average fiber length of 3 to 12 mm.

In addition, the granular carbon-based filler may include at least one selected from the group consisting of graphite, graphene, fullerene and carbon black.

In addition, the granular carbon-based filler may have an average particle diameter of 5 to 350 μm.

In addition, the carbon-based filler may include the fibrous carbon-based filler and the granular carbon-based filler at a weight ratio of 1:0.5 to 7.

In addition, the heat-dissipating plastic may include 10 to 80 parts by weight of the carbon-based filler based on 100 parts by weight of the main resin.

In addition, the average fiber diameter (μm) of the fibrous carbon-based filler and the average particle diameter (μm) of the granular carbon-based filler may have a length ratio of 1:0.2 to 80.

In addition, the main resin may include one compound or a mixture or copolymer of two or more selected from the group consisting of polyamide, polyester, polyketone, liquid crystal polymer, polyolefin, polyphenylene sulfide (PPS), polyether ether ketone (PEEK), polyphenylene oxide (PPO), polyether sulfone (PES), polyether imide (PEI), polyimide (PI), polyphthalamide (PPA), polybutylene terephthalate (PBT), acrylonitrile butadiene styrene copolymer resin (ABS), polymethyl methacrylate (PMMA) and polyarylate (PAR).

Meanwhile, throughout the specification, when the axis passing through two points is defined as a major axis such that the distance between the two points on the carbon-based filler has the longest distance, and the axis passing through two points is defined as a minor axis such that the distance between the two points through which an imaginary line orthogonal to the major axis passes on the carbon-based filler has the longest distance, the term 'granular' used in the present invention indicates that the length ratio of the major axis to the minor axis is less than 4, and the term 'fibrous' indicates that the length ratio of the major axis to the minor axis is 4 or more.

Advantageous Effects

According to the present invention, the heat-dissipating plastic has remarkably excellent heat dissipation characteristics due to the remarkably excellent thermal conductivity, and it has an effect that the mechanical strength is remarkably excellent even though it is designed to have remarkably excellent heat dissipation characteristics. Accordingly, the implemented heat-dissipating plastic can be widely applied in various technical fields where excellent heat dissipation performance and mechanical strength are required at the same time.

DESCRIPTION OF DRAWINGS

FIG. 1 is a cross-sectional view of the heat-dissipating plastic according to an exemplary embodiment of the present invention.

BEST MODE

Hereinafter, exemplary embodiments of the present invention will be described in detail with reference to the accompanying drawings such that those of ordinary skill in the art to which the present invention pertains may easily practice the present invention. The present invention may be implemented in various different forms and is not limited to the exemplary embodiments described herein. In the drawings, parts that are irrelevant to the description are omitted in order to clearly describe the present invention, and the same reference numerals are assigned to the same or similar components throughout the specification.

As illustrated in FIG. 1, the heat-dissipating plastic 100 according to the present invention is implemented by including a polymer matrix 10 formed by including a main resin; and a carbon-based filler which is provided by being dispersed in the polymer matrix 10, and includes a fibrous carbon-based filler 20 and a granular carbon-based filler 30.

First, the polymer matrix 10 will be described. The polymer matrix 10 is a carrier containing a carbon-based filler to be described below, and maintains the shape of a heat-dissipating plastic, and the main resin which forms the polymer matrix 10 may be used without limitation as long as it is an organic compound commonly used in the art, and preferably, it may be one compound or a mixture or copolymer of two or more selected from the group consisting of polyamide, polyester, polyketone, liquid crystal polymer, polyolefin, polyphenylene sulfide (PPS), polyether ether ketone (PEEK), polyphenylene oxide (PPO), polyether sulfone (PES), polyether imide (PEI) and polyimide. The polyamide may be a known polyamide-based compound such as nylon 6, nylon 66, nylon 11, nylon 610, nylon 12, nylon 46, nylon 9T (PA-9T), Qiana, Aramid and the like.

For example, the polyester may be a known polyester-based compound such as polyethylene terephthalate (PET), polytrimethylene terephthalate (PTT), polybutylene terephthalate (PBT), polycarbonate and the like.

As another example, the polyolefin may be a known polyolefin-based compound such as polyethylene, polypropylene, polystyrene, polyisobutylene, ethylene vinyl alcohol and the like.

The liquid crystal polymer may be used without limitation in the case of a polymer exhibiting liquid crystallinity in a solution or dissolved state, and since it may be a known type, the present invention is not particularly limited thereto.

Meanwhile, the heating element to which the heat-dissipating plastic is applied may not only have a flat surface, but also may be formed with a step difference. Accordingly, if the flexibility of the heat-dissipating plastic is deteriorated, the adhesion to the surface where the step difference is formed may not be good, and if the heat-dissipating plastic is pressed and adhered to increase the adhesion, the heat-dissipating plastic may be broken or damaged, and as a result, the heat dissipation characteristics may be significantly deteriorated. Accordingly, the heat-dissipating plastic according to an exemplary embodiment of the present invention may use the above-described main resin as the main resin.

Next, the carbon-based filler will be described.

The carbon-based filler includes a fibrous carbon-based filler 20 and a granular carbon-based filler 30 as described above.

The fibrous carbon-based filler 20 performs functions of expressing excellent mechanical strength and heat dissipation performance, and it may be used without limitation as long as it is a fibrous carbon-based filler that may be commonly used, and preferably, a pitch-based carbon fiber may be used. In addition, more preferably, it may include at least one selected from the group consisting of an isotropic pitch-based carbon fiber and an anisotropic pitch-based carbon fiber, and more preferably, the use of an anisotropic pitch-based carbon fiber may be more advantageous in terms of heat dissipation performance and mechanical strength according to compatibility with the above-described main resin.

In addition, the fibrous carbon-based filler 20 may have an average fiber diameter of 5 to 20 μm, and preferably, an average fiber diameter of 6 to 18 μm. If the average fiber diameter of the fibrous carbon-based filler is less than 5 μm, heat dissipation characteristics may be deteriorated, and if the average fiber diameter is more than 20 μm, the surface condition and durability may be deteriorated as dispersibility decreases.

In addition, the fibrous carbon-based filler 20 may have an average fiber length of 3 to 12 mm, and preferably, an average fiber length of 5 to 10 mm. If the average fiber length of the fibrous carbon-based filler is less than 3 mm, heat dissipation characteristics and mechanical strength may be deteriorated, and if the average fiber length is more than 12 mm, the surface condition and durability may be deteriorated as dispersibility decreases.

In addition, the granular carbon-based filler 30 performs a function of expressing excellent heat dissipation performance, and it may be used without limitation as long as it is a granular carbon-based filler that may be commonly used. In addition, preferably, it may include at least one selected from the group consisting of graphite, graphene, fullerene and carbon black, and more preferably, it may include graphite.

In this case, when the granular carbon-based filler 30 includes graphite, the graphite may be implemented as a graphite composite.

The graphite composite may include graphite, a graphite composite including nanoparticles bound to the graphite surface, and a catecholamine layer, and it may further include a polymer layer.

The graphite is a mineral in which a planar macromolecule, in which a six-membered ring of carbon atoms is infinitely connected in a plane, is stacked in a layered layer, and it may be a type known in the art. In addition, specifically, it may be any one of natural graphite or artificial graphite among impression graphite, high crystalline graphite and earth graphite. When the graphite is natural graphite, for example, it may be expanded graphite obtained by expanding the impression graphite. The artificial graphite may be prepared through a known method. For example, a thermosetting resin such as polyimide may be prepared in a film shape of 25 μm or less, and then graphitized at a high temperature of 2,500° C. or more to produce graphite in a single crystal state, or a hydrocarbon such as methane may be pyrolyzed at a high temperature to prepare highly oriented graphite by chemical vapor deposition (CVD).

In addition, the shape of the graphite may be a known shape, such as a spherical shape, a plate shape, a needle shape or the like, or an atypical shape, and for example, it may be a plate shape. The graphite may be high-purity graphite having a purity of 99% or more, and through this, it may be advantageous in expressing more improved physical properties.

Nanoparticles bound to the surface of the graphite described above function as a medium capable of providing the graphite with a catecholamine layer, which will be described below. When this is described in detail, as the surface of the above-described graphite is hardly provided with a functional group that may mediate a chemical reaction, it is not easy to provide a catecholamine layer that may improve the dispersibility of graphite in different materials on the surface of the graphite, and accordingly, even if catecholamine is treated on graphite, there is a problem in that the amount of catecholamine remaining on the actual graphite is very small. In addition, in order to solve this problem, there is a limitation to increasing the amount of catecholamine provided on the surface of the modified graphite, even if the modification treatment is performed such that the functional groups are provided on the graphite surface. However, in the case of graphite having nanoparticles provided on the surface, as catecholamine is easily bound to the surface of the nanoparticles, there is an advantage that a desired amount of catecholamine may be introduced onto the graphite.

The nanoparticles may be metal or non-metal materials that exist as solids at room temperature, and as non-limiting examples thereof, the nanoparticles may be selected from alkali metals, alkaline earth metals, lanthanum groups, actinium groups, transition metals, post-transition metals, metalloids and the like in the periodic table. For example, the nanoparticles may be Ni, Si, Ti, Cr, Mn, Fe, Co, Cu, Sn, In, Pt, Au, Mg and a combination thereof, and are preferably Cu, Ni or Si.

In addition, the nanoparticles may have an average particle diameter of 10 to 500 nm, and preferably, 10 to 100 nm.

In addition, the nanoparticles are preferably in the form of crystallized particles, and may be provided to occupy an area of 10 to 70%, and more preferably, 30 to 70% of the total surface area of the individual graphite. In addition, the nanoparticles may be provided in an amount of 5 to 70 wt. %, and preferably, 20 to 60 wt. %, based on the total weight of the granular carbon-based filler including the graphite composite. In this case, the nanoparticles may exhibit a stronger binding force by forming chemical bonds with graphite.

Next, the catecholamine layer may be provided at least on the surface of the above-described nanoparticles, thereby improving the excellent fluidity, dispersibility, and interfacial bonding properties between the graphite composite and the polymer compound in the polymer compound having heterogeneous materials to be described below. In addition, the catecholamine layer itself has a reducing power, and at the same time, the amine functional group forms a covalent bond by the Michael addition reaction to the catechol functional group on the surface of the layer such that the secondary surface modification is possible using the catecholamine layer as an adhesive material. For example, it may act as a binding material capable of introducing a polymer layer onto graphite in order to express more improved dispersibility in the polymer compound.

Catecholamine, which forms the catecholamine layer, is a term that refers to a single molecule having a hydroxy group (—OH) as an ortho-group of a benzene ring, and various alkylamines as para-groups. As non-limiting examples of various derivatives of this construct, there are dopamine, dopamine-quinone, epinephrine, alpha-methyldopamine, norepinephrine, alpha-methyldopa, droxidopa, indolamine, serotonin, 5-hydroxydopamine or the like, and for example, the catecholamine layer may be a dopamine layer. The dopamine is a monomolecular substance having a molecular weight of 153 (Da) having catechol and an amine functional group, and for example, when a material intended to be surface-modified is placed in an aqueous solution in a basic pH condition (about pH 8.5) including dopamine represented by Chemical Formula 1 below and is taken out after a certain period of time, a polydopamine (pDA) coating layer may be formed on the surface of the material due to the oxidation of catechol.

[Chemical Formula 1]

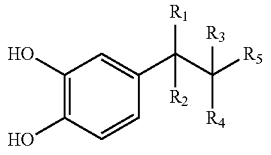

In Chemical Formula 1, at least one of $R_1$, $R_2$, $R_3$, $R_4$ and $R_5$ is each thiol, primary amine, secondary amine, nitrile, aldehyde, imidazole, azide, halide, polyhexamethylene dithiocarbonate, hydroxyl, carboxylic acid, carboxylic acid ester or carboxamide, and the rest may be hydrogen.

In addition, the thickness of the catecholamine layer may be 5 to 100 nm, but is not limited thereto.

Meanwhile, a polymer layer may be further coated on the catecholamine layer, and further improved fluidity, dispersibility and interfacial bonding properties may be implemented as compatibility with the polymer compound forming the composite material increases due to the polymer layer. The polymer layer may be implemented with a thermosetting polymer compound or a thermoplastic polymer compound, and specific types of the thermosetting polymer compound and the thermoplastic polymer compound may be those that are already known. As non-limiting examples thereof, the thermosetting polymer compound may be one compound or a mixture or copolymer of two or more selected from the group consisting of epoxy-based, urethane-based, ester-based and polyimide-based resins. The thermoplastic polymer compound may be one compound or a mixture or copolymer of two or more selected from the group consisting of polyamide, polyester, polyketone, liquid crystal polymer, polyolefin, polyphenylene sulfide (PPS), polyether ether ketone (PEEK), polyphenylene oxide (PPO), polyethersulfone (PES), polyetherimide (PEI) and polyimide. Alternatively, the polymer layer may be a rubber elastomer including natural rubber and/or synthetic rubber, and a similar material thereof.

As described above, the granular carbon-based filler 30 may include a graphite composite, and the graphite composite may be prepared by including a step of preparing a graphite-nanoparticle conjugate in which nanoparticles are formed on a graphite surface, and a step of forming a catecholamine layer on the graphite-nanoparticle conjugate, and after forming the catecholamine layer, it may be prepared by further performing a step of further forming a polymer layer.

The step of preparing a graphite-nanoparticle conjugate in which nanoparticles are formed on a graphite surface according to an exemplary embodiment of the present invention may be employed without limitation in the case of a known method of forming nanoparticles on a graphite surface, and is not limited thereto. As non-limiting examples thereof, in the case of non-insulating nanoparticles, methods such as inert gas condensation (IGC), chemical vapor condensation (CVC), metal salt spray-drying and the like may be employed as the conventional vapor phase synthesis techniques for preparing metallic nanopowder. However, among these, the inert gas condensation (IGC) process is capable of producing ultra-fine nano-metal powders with high purity, but requires a lot of energy and has a very low production rate, which limits industrial application, and the chemical vapor condensation (CVC) process is somewhat improved in terms of energy and the production rate compared to the inert gas condensation (IGC) process, but it may be uneconomical because the price of a precursor, which is a raw material, is very expensive. In addition, the metal salt spray-drying process is economical because it uses inexpensive salts as raw materials, but contamination and agglomeration of powder in the drying step cannot be avoided, and since toxic by-products are generated, it is disadvantageous in terms of the environment.

As such, preferably, nanoparticles may be formed on graphite through high-frequency thermal plasma at atmospheric pressure. Specifically, it may be performed through a step of mixing graphite and nanoparticle-forming powder, a step of injecting a gas into the prepared mixture, a step of vaporizing a nanoparticle-forming material through a high-frequency thermal plasma, and a step of crystallizing the vaporized nanoparticle-forming material on a graphite surface First, in the step of mixing graphite and nanoparticle-forming powder, the mixing ratio between the two materials may be designed differently depending on the purpose.

Next, gas may be injected into the mixed mixture, and in this case, the injected gas may be classified into sheath gas, central gas, carrier gas and the like, depending on its function, and for these gases, an inert gas such as argon, hydrogen, nitrogen or a mixture thereof may be used, and argon gas may be preferably used. The sheath gas is injected to prevent vaporized nanoparticles from adhering to the inner surface of the wall and also to protect the wall surface from ultra-high temperature plasma, and 30 to 80 lpm (liters per minute) of argon gas may be used. In addition, the central gas is a gas which is injected to generate high-temperature thermal plasma, and 30 to 70 lpm of argon gas may be used. In addition, the carrier gas serves to supply the mixture into the plasma reactor, and 5 to 15 lpm of argon gas may be used.

Next, the nanoparticle-forming material may be vaporized through high-frequency thermal plasma. The thermal plasma is an ionizing gas composed of electrons, ions, atoms and molecules generated by a plasma torch using a DC arc or high frequency inductively coupled discharge, and it is a high-speed jet with ultra-high temperatures ranging from thousands to tens of thousands of K and high activity. Accordingly, in order to smoothly generate high-temperature plasma, 10 to 70 kW of power is supplied to the power supply device of the plasma device, an arc is formed by electric energy, and an ultra-high temperature plasma of about 10,000 K is generated by argon gas used as a thermal plasma generator. As described above, the ultra-high temperature thermal plasma generated by using argon gas as the generating gas while maintaining 10 to 70 kW of the power has an effect that is generated at a higher temperature than the thermal plasma generated by the heat treatment method or the combustion method. In this case, in the present invention, a known high-frequency thermal plasma (RF) method may be appropriately modified and used, and an existing thermal plasma treatment apparatus may be used.

Next, the step of crystallizing the vaporized nanoparticle-forming material on a graphite surface may be performed. In order to crystallize the vaporized nanoparticle-forming material on a graphite surface, a quenching gas may be used. In this case, it may be crystallized while inhibiting the growth of nanoparticles by condensing or quenching with the quenching gas.

Afterwards, the step of forming a catecholamine layer on the graphite-nanoparticle conjugate prepared by the above-described method may be performed, and specifically, a step of dipping the graphite-nanoparticle conjugate in a weakly basic dopamine aqueous solution; and a step of forming a polydopamine layer on the surface of the graphite-nanoparticle conjugate may be performed.

First, a method of preparing the weakly basic dopamine aqueous solution is not particularly limited, but it may be prepared by dissolving dopamine in a tris buffer solution (10 mM, tris buffer solution) having a pH of 8 to 14, and more preferably, a tris buffer solution having a basic pH of 8.5, which is the same basic condition as the environment in the sea, and in this case, the dopamine concentration of the weakly basic dopamine solution may be 0.1 to 5 mg/mL, and preferably, 2 mg/mL.

After dipping the graphite-nanoparticle conjugate in the prepared weakly basic dopamine aqueous solution, dopamine spontaneously undergoes a polymerization reaction under basic and oxidizing conditions, thereby forming a catecholamine layer, which is a polydopamine layer, on the graphite-nanoparticle conjugate. In this case, the polydopamine layer may be formed by further providing an oxidizing agent, and without an oxidizing agent, oxygen gas in the air may be used as an oxidizing agent, and the present invention is not particularly limited thereto.

In this case, the dipping time determines the thickness of the polydopamine layer, and in the case of using a dopamine aqueous solution having a pH of 8 to 14 and a dopamine concentration of 0.1 to 5 mg/mL, it is preferable to dip for 0.5 to 24 hours in order to form a catecholamine layer with a thickness of 5 to 100 nm. In pure plate-shaped graphite, a dopamine coating layer is hardly formed on the graphite surface through this method, but due to the nanoparticles, a catecholamine layer may be formed on the nanoparticles. Meanwhile, dipping was illustrated as the method of forming the polymer layer described above, but the present invention is not limited thereto, and the polymer layer may be further formed through known methods such as the blade coating, flow coating, casting, printing method, transfer method, brushing, spraying or the like.

Meanwhile, in order to further provide a polymer layer on the graphite composite in which the catecholamine layer is formed, a graphite composite in which a polymer layer is formed may be prepared by mechanically mixing the graphite composite with a solution in which a desired polymer compound is dissolved or a molten melt solution.

Meanwhile, the granular carbon-based filler 30 may have an average particle diameter of 5 to 350 μm, and preferably, an average particle diameter of 10 to 300 μm. If the average particle diameter of the granular carbon-based filler is less than 5 μm, the mechanical strength may be deteriorated, and if the average particle diameter is more than 350 μm, the mechanical strength may be deteriorated.

In addition, the carbon-based filler may include the fibrous carbon-based filler 20 and the granular carbon-based filler 30 at a weight ratio of 1:0.5 to 7, and preferably, at a weight ratio of 1:1 to 5. If the weight ratio of the fibrous carbon-based filler and the granular carbon-based filler included in the carbon-based filler is less than 1:0.5, the heat dissipation characteristics may be deteriorated, and if the weight ratio is more than 1:7, the mechanical strength may be deteriorated.

Meanwhile, the carbon-based filler may be included in an amount of 10 to 80 parts by weight, and preferably, 20 to 60 parts by weight, based on 100 parts by weight of the main resin. If the carbon-based filler is less than 10 parts by weight based on 100 parts by weight of the main resin, the heat dissipation characteristics and mechanical strength may be deteriorated, and if it is more than 80 parts by weight, the surface characteristics may be deteriorated due to the presence of the carbon-based filler protruding from the surface, and rather, the mechanical strength and durability may be deteriorated.

Meanwhile, the average fiber diameter (μm) of the above-described fibrous carbon-based filler 20 and the average particle diameter (μm) of the granular carbon-based filler 30 may have a length ratio of 1: 0.2 to 80, and preferably, 1: 0.5 to 60. As the length ratio of the average fiber diameter (μm) of the fibrous carbon-based filler 20 and the average particle diameter (μm) of the granular carbon-based filler 30 satisfies the above range, the mechanical strength and heat dissipation characteristics may be more excellent.

Meanwhile, the heat-dissipating plastic according to an exemplary embodiment of the present invention may be implemented by including at least one selected from the group consisting of an antioxidant, an impact improver, a flame retardant, a strength improver, a heat stabilizer, a light stabilizer, a plasticizer, an antistatic agent, a work improver, a UV absorber, a dispersant and a coupling agent, as additives.

The antioxidant prevents the main chain of the polymer compound from being broken by shearing during extrusion and injection, and is provided to prevent heat discoloration and the like. For the antioxidant, known antioxidants may be used without limitation, and non-limiting examples thereof may include organophosphites such as tris(nonyl phenyl) phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis [3-(3,5-di-tert-butyl-4-hydroxyphenyl) propionate or the like; amides of beta-(3,5-di-tert-butyl-4-hydroxyphenyl)-propionic acid or the like, or mixtures thereof. The antioxidant may be provided in an amount of 0.01 to 0.5 parts by weight based on 100 parts by weight of the main resin.

The impact improver may be used without limitation in the case of known components capable of improving the impact resistance by expressing the flexibility and stress relaxation properties of a composite material, and for example, at least one component selected from the group consisting of thermoplastic polyurethane (TPU), thermoplastic polyolefin (TPO), maleic acid-grafted EPDM, core/shell structured elastic particles, rubber-based resins and polyamide-based materials may be provided as the impact improver. The thermoplastic polyolefin is a group of materials similar to rubber, and it may be a linear polyolefin block copolymer having a polyolefin block such as polypropylene or polyethylene and a rubber block or a polypropylene blended with ethylene-propylene-diene monomer (EPDM), which is an ethylene-based elastomer, and since known thermoplastic polyolefin may be used for the specific thermoplastic polyolefin, the description of a specific type thereof will be omitted in the present invention. In addition, since known thermoplastic polyurethane may be used for the thermoplastic polyurethane, the description of a specific type thereof will be omitted. In addition, for the core/shell structured elastic particles, for example, an allyl-based resin may be used for the core, and the shell portion may be a polymer resin having a functional group which is capable of reacting to increase compatibility and bonding strength with the thermoplastic polymer compound.

For example, the flame retardant may include halogenated flame retardants, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethyl ene-bis(tetrabromophthalimide, bis(pentabromobenzyl)ethane, metal hydroxides like $Mg(OH)_2$ and $Al(OH)_3$, melamine cyanurate, phosphor-based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N-(N'-benzylaminocarbonyl) sulfanylimide potassium salt, or mixtures thereof, but is not limited thereto. The flame retardant may be included in an amount of 0.1 to 50 parts by weight based on 100 parts by weight of the main resin.

The strength improver may be used without limitation in the case of known components capable of improving the strength of a composite material, and as non-limiting examples thereof, at least one component selected from the group consisting of glass fiber, glass beads, zirconium oxide, wollastonite, gibbsite, boehmite, magnesium aluminate, dolomite, calcium carbonate, magnesium carbonate, mica, talc, silicon carbide, kaolin, calcium sulfate, barium sulfate, silicon dioxide, ammonium hydroxide, magnesium hydroxide and aluminum hydroxide may be included as a strength improver. For example, the strength improver may be glass fiber. The strength improver may be included in an amount of 5 to 35 parts by weight, preferably, 15 to 35 parts by weight, and more preferably, 25 to 33.3 parts by weight, based on 100 parts by weight of the main resin.

Meanwhile, when a glass fiber is used as the strength improver, the glass fiber may have a length of 2 to 8 mm, preferably, 2 to 7 mm, and most preferably, 4 mm, and an average fiber diameter of 1 to 30 μm, preferably, 3 to 20 μm, and most preferably, 10 μm.

In addition, the heat stabilizer may be used without limitation in the case of known heat stabilizers, and non-limiting examples thereof include organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or mixtures thereof. The heat stabilizer may be included in an amount of 0.01 to 0.5 parts by weight based on 100 parts by weight of the main resin.

In addition, the light stabilizer may be used without limitation in the case of known light stabilizers, and non-limiting examples thereof may include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like, or mixtures thereof.

In addition, the plasticizer may be used without limitation in the case of known plasticizers, and non-limiting examples thereof may include phthalic acid esters such as dioctyl-4, 5-epoxy-hexahydrophthalate, tris-(octoxycarbonylethyl)isocyanurate, tristearin, epoxidized soybean oil or the like, or mixtures thereof. The plasticizer may be included in an amount of 0.5 to 3.0 parts by weight based on 100 parts by weight of the main resin.

In addition, as the antistatic agent, known antistatic agents may be used without limitation, and non-limiting examples thereof include glycerol monostearate, sodium stearyl sulfonate, sodium dodecylbenzenesulfonate, polyether block amides, or mixtures thereof, which are commercially available from, for example, BASF under the Tradename Irgastat; Arkema under the Tradename PEBAX; and Sanyo Chemical industries under the Tradename Pelestat. The antistatic agent may be included in an amount of 0.1 to 1.0 parts by weight based on 100 parts by weight of the main resin.

In addition, for the work improver, known work improvers may be used without limitation, and non-limiting examples thereof may include metal stearate, stearyl stearate, pentaerythritol tetrastearate, beeswax, montan wax, paraffin wax, polyethylene wax or the like, or mixtures thereof. The work improver may be included in an amount of 0.1 to 1.0 parts by weight based on 100 parts by weight of the main resin.

In addition, for the UV absorber, known UV absorbers may be used without limitation, and non-limiting examples thereof include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3 -tetramethylbutyl)-phenol; 2-hydroxy-4-n-octyloxybenzophenone; 2-[4,6-bis(2,4-dimethylphenyl)-1,3,5-triazin-2-yl]-5-(octyloxy)-phenol; 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide and zinc oxide, all with particle size less than 100 nanometers; or the like, or mixtures thereof. The UV absorber may be included in an amount of 0.01 to 3.0 parts by weight based on 100 parts by weight of the main resin.

In addition, for the dispersant and the coupling agent, known dispersants and coupling agents may be used without limitation, and as non-limiting examples of the coupling agent, maleic acid-grafted polypropylene, a silane-based coupling agent and the like may be used for heat resistance Modes of the invention The present invention will be described in more detail through the following examples, but the following examples do not limit the scope of the present invention, and these examples should be construed to aid the understanding of the present invention.

<Example 1>

First, in order to prepare a granular carbon-based filler provided in a polymer matrix, graphite having nickel (Ni) nanoparticles formed on the surface at 23° C. and the atmospheric condition was immersed in a coating composition in which dopamine provided at a concentration of 2 mM was mixed with 13 parts by weight of sodium periodate ($Na_2S_2O_8$) as an oxidizing agent and 20 parts by weight of a buffer solution (Tris-base, Fischer) based on 100 parts by weight of the dopamine in a solvent including 65 wt.% of pure water (DI water) and 35 wt.% of methanol, and after stirring for 2.5 hours, it was filtered and washed with DI water and dried at 23° C. to form a catecholamine layer on a graphite surface to prepare a graphite composite.

Based on 100 parts by weight of PA6 as a main resin, it was mixed with 45 parts by weight of a carbon-based filler including an anisotropic pitch-based carbon fiber having an average fiber diameter of 10 μm and an average fiber length of 7.5 mm as a fibrous carbon-based filler and the prepared graphite composite having an average particle diameter of 200 μm as a granular carbon-based filler at a weight ratio of 1: 3.5, and after compounding to prepare pellets, a heat-dissipating plastic as shown in FIG. 1 was prepared through injection.

<Examples 2 to 22 and Comparative Example 2>

Heat-dissipating plastics as shown in Tables 1 to 4 were prepared in the same manner as in Example 1, except that the type of a fibrous carbon-based filler, the average fiber diameter, the average fiber length, the average particle diameter of a granular carbon-based filler, the weight ratio of the fibrous carbon-based filler to the granular carbon-based filler, the content of the carbon-based filler and the average fiber diameter of the fibrous carbon-based filler and the average particle diameter of the fibrous carbon-based filler and the length ratio of the granular carbon-based filler were changed.

<Experimental Example>

The following physical properties were evaluated for each of the heat-dissipating plastics prepared according to the examples and comparative examples, and the results are shown in Tables 1 to 4.

1. Evaluation of heat dissipation performance

In order to prevent external influences, performance evaluation was performed in a sealed chamber measuring 30 cm×30 cm×30 cm in width, length and height, respectively. Specifically, the heat dissipation performance was evaluated by attaching a planar heating element to the heat-dissipating plastic, applying a current of 350 mA to generate heat, and measuring the temperature of the planar heating element after holding for 60 minutes.

In this case, a high measurement temperature means poor heat dissipation performance, and a low measurement temperature means excellent heat dissipation performance.

In addition, based on the measurement temperature of Example 1 as 100, the measurement temperatures for the rest of the examples and comparative examples were shown as relative percentages.

2. Evaluation of mechanical strength

The flexural strength of the heat-dissipating plastic was evaluated using a universal tensile tester (Utm).

In this case, based on the flexural strength of Example 1 as 100, the flexural strengths of the rest of the examples and comparative examples was shown as relative percentages.

3. Evaluation of durability

After 480 hours elapsed after placing the heat-dissipating plastic in a chamber at a temperature of 85° C. and a relative humidity of 85%, the surface condition of the heat-dissipating plastic was visually evaluated. As a result of the evaluation, cracks in the polymer matrix and the presence or absence of peeling or protrusion of the carbon-based filler were confirmed, and if there was no abnormality, it was indicated as ○, and if abnormality occurred, it was expressed as ×.

TABLE 1

| Classification | | | Example 1 | Example 2 | Example 3 | Example 4 | Example 5 | Example 6 |
|---|---|---|---|---|---|---|---|---|
| Carbon-based filler | Fibrous carbon-based filler | Type | Anisotropic | Isotropic | Anisotropic | Anisotropic | Anisotropic | Anisotropic |
| | | Average fiber diameter (μm) | 10 | 10 | 3 | 6 | 18 | 23 |
| | | Average fiber length (mm) | 7.5 | 7.5 | 7.5 | 7.5 | 7.5 | 7.5 |
| | Granular carbon-based filler | Average particle diameter (μm) | 200 | 200 | 270 | 200 | 200 | 200 |
| | Length ratio of average fiber diameter of fibrous and average diameter of granular | | 1:20 | 1:20 | 1:90 | 1:33.3 | 1:11.1 | 1:8.7 |
| | Weight ratio of fibrous and granular | | 1:3.5 | 1:3.5 | 1:3.5 | 1:3.5 | 1:3.5 | 1:3.5 |
| | Content (parts by weight) | | 45 | 45 | 45 | 45 | 45 | 45 |
| Evaluation of heat dissipation performance | | | 100 | 117 | 125 | 104 | 98 | 95 |
| Evaluation of flexural strength | | | 100 | 83 | 107 | 103 | 100 | 100 |
| Evaluation of durability | | | ○ | x | ○ | ○ | ○ | x |

TABLE 2

| Classification | | | Example 7 | Example 8 | Example 9 | Example 10 | Example 11 | Example 12 |
|---|---|---|---|---|---|---|---|---|
| Carbon-based filler | Fibrous carbon-based filler | Type | Anisotropic | Anisotropic | Anisotropic | Anisotropic | Anisotropic | Anisotropic |
| | | Average fiber diameter (μm) | 10 | 10 | 10 | 10 | 10 | 10 |
| | | Average fiber length (mm) | 1 | 5 | 10 | 15 | 7.5 | 7.5 |
| | Granular carbon-based filler | Average particle diameter (μm) | 200 | 200 | 200 | 200 | 1 | 10 |
| | Length ratio of average fiber diameter of fibrous and average diameter of granular | | 1:20 | 1:20 | 1:20 | 1:20 | 1:0.1 | 1:1 |
| | Weight ratio of fibrous and granular | | 1:3.5 | 1:3.5 | 1:3.5 | 1:3.5 | 1:3.5 | 1:3.5 |
| | Content (parts by weight) | | 45 | 45 | 45 | 45 | 45 | 45 |
| Evaluation of heat dissipation performance | | | 123 | 104 | 99 | 97 | 131 | 105 |
| Evaluation of flexural strength | | | 94 | 99 | 104 | 108 | 82 | 95 |
| Evaluation of durability | | | ○ | ○ | ○ | x | ○ | ○ |

TABLE 3

| Classification | | | Example 13 | Example 14 | Example 15 | Example 16 | Example 17 | Example 18 |
|---|---|---|---|---|---|---|---|---|
| Carbon-based filler | Fibrous carbon-based filler | Type | Anisotropic | Anisotropic | Anisotropic | Anisotropic | Anisotropic | Anisotropic |
| | | Average fiber diameter (μm) | 6 | 10 | 10 | 10 | 10 | 10 |
| | | Average fiber length (mm) | 7.5 | 7.5 | 7.5 | 7.5 | 7.5 | 7.5 |
| | Granular carbon-based filler | Average particle diameter (μm) | 300 | 400 | 200 | 200 | 200 | 200 |
| | Length ratio of average fiber diameter of fibrous and average diameter of granular | | 1:50 | 1:40 | 1:20 | 1:20 | 1:20 | 1:20 |

TABLE 3-continued

| Classification | Example 13 | Example 14 | Example 15 | Example 16 | Example 17 | Example 18 |
|---|---|---|---|---|---|---|
| Weight ratio of fibrous and granular | 1:3.5 | 1:3.5 | 1:0.1 | 1:1 | 1:5 | 1:10 |
| Content (parts by weight) | 45 | 45 | 45 | 45 | 45 | 45 |
| Evaluation of heat dissipation performance | 94 | 92 | 136 | 106 | 97 | 96 |
| Evaluation of flexural strength | 96 | 72 | 105 | 105 | 97 | 75 |
| Evaluation of durability | ○ | x | ○ | ○ | ○ | x |

TABLE 4

| Classification | | | Example 19 | Example 20 | Example 21 | Example 22 | Comparative Example 1 | Comparative Example 2 |
|---|---|---|---|---|---|---|---|---|
| Carbon-based filler | Fibrous carbon-based filler | Type | Anisotropic | Anisotropic | Anisotropic | Anisotropic | — | Anisotropic |
| | | Average fiber diameter (μm) | 10 | 10 | 10 | 10 | — | 10 |
| | | Average fiber length (mm) | 7.5 | 7.5 | 7.5 | 7.5 | — | 7.5 |
| | Granular carbon-based filler | Average particle diameter (μm) | 200 | 200 | 200 | 200 | 200 | — |
| | Length ratio of average fiber diameter of fibrous and average diameter of granular | | 1:20 | 1:20 | 1:20 | 1:20 | — | — |
| | Weight ratio of fibrous and granular | | 1:3.5 | 1:3.5 | 1:3.5 | 1:3.5 | — | — |
| | Content (parts by weight)) | | 5 | 20 | 60 | 100 | 45 | 45 |
| Evaluation of heat dissipation performance | | | 161 | 109 | 95 | 94 | 120 | 93 |
| Evaluation of flexural strength | | | 71 | 94 | 97 | 76 | 106 | 69 |
| Evaluation of durability | | | ○ | ○ | ○ | x | ○ | ○ |

As can be seen from Tables 1 to 4, Examples 1, 4, 5, 8, 9, 12, 13, 16, 17, 20 and 21, which satisfied all of the type, average fiber diameter, and average fiber length of the fibrous carbon-based filler, the average particle diameter of the granular carbon-based filler, the weight ratio of the fibrous carbon-based filler and the granular carbon-based filler, the content of the carbon-based filler and the length ratio of the average diameter of the fibrous carbon-based filler and the average diameter of the granular carbon-based filler according to the present invention, simultaneously exhibited all of remarkably excellent heat dissipation performance, mechanical strength and durability, compared to Examples 2, 3, 6, 7, 10, 11, 14, 15, 18, 19, 22 and Comparative Examples 1 to 2, in which any one of the above was omitted.

Although an exemplary embodiment of the present invention has been described above, the spirit of the present invention is not limited to the exemplary embodiment presented in the present specification, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. A heat-dissipating plastic, comprising:

a polymer matrix comprising a main resin; and a carbon-based filler which is dispersed in the polymer matrix, and comprises a fibrous carbon-based filler and a granular carbon-based filler, wherein the fibrous carbon-based filler is an anisotropic pitch-based carbon fiber, and the carbon-based filler comprises the fibrous carbon-based filler and the granular carbon-based filler at a weight ratio of 1:1 to 5, wherein the heat-dissipating plastic comprises 20 to 60 parts by weight parts by weight of the carbon-based filler based on 100 parts by weight of the main resin, wherein the anisotropic pitch-based carbon fiber has an average fiber diameter of 6 to 18 μm and an average fiber length of 5 to 10 mm, wherein the granular carbon-based filler has an average particle diameter of 10 to 300 μm, wherein an average fiber diameter of the anisotropic pitch-based carbon fiber and an average particle diameter of the granular carbon-based filler have a diameter ratio of 1:0.5 to 60, and wherein the granular carbon-based filler comprises a graphite composite, the graphite composite comprises graphite, nanoparticles bonded to a surface of the graphite and a catecholamine layer, and the nanoparticles are Cu, Ni or Si.

2. The heat-dissipating plastic of claim 1, wherein the main resin comprises one compound or a mixture or copolymer of two or more selected from the group consisting of polyamide, polyester, polyketone, liquid crystal polymer, polyolefin, polyphenylene sulfide (PPS), polyether ether ketone (PEEK), polyphenylene oxide (PPO), polyether sulfone (PES), polyether imide (PEI), polyimide (PI), polyphthalamide (PPA), polybutylene terephthalate (PBT), acrylonitrile butadiene styrene copolymer resin (ABS), polymethyl methacrylate (PMMA) and polyarylate (PAR).

* * * * *